United States Patent Office 3,039,859
Patented June 19, 1962

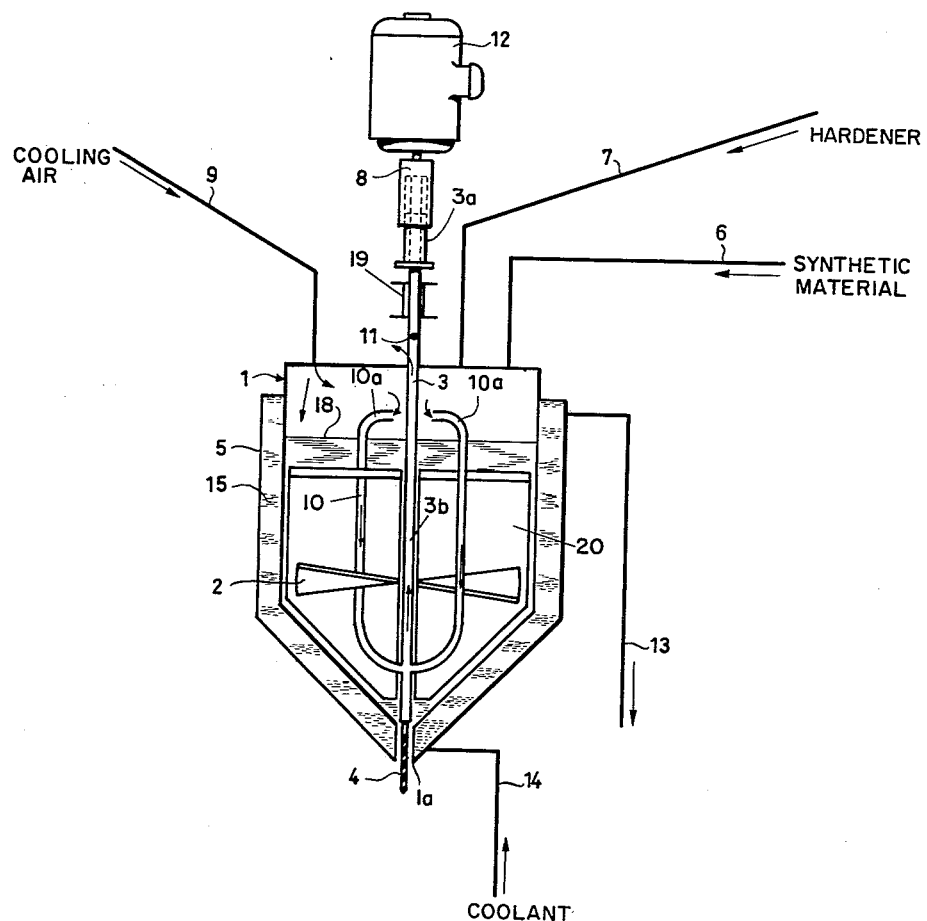

3,039,859
APPARATUS FOR PRETREATING CHEMICALLY REACTING MATERIALS
Rainer Kurz, Stuttgart-Stammheim, Germany, assignor to Firma Paul Lechler, Stuttgart, Germany
Filed Dec. 20, 1957, Ser. No. 704,130
2 Claims. (Cl. 23—285)

This invention relates to the manufacture of synthetic materials, and is directed particularly to apparatus for the treatment of synthetic materials of the type which are produced by chemical reaction.

The group of plastic materials which are solidified by polymerization, polyaddition, condensation or similar chemical reactions can before the manufacturing proper be pretreated in order to initiate the chemical reaction. The required hardening period is thus shortened and an improvement in the material characteristics upon manufacturing is effected. The principal object of this invention is to provide apparatus for automatically achieving such pretreatment in a continuously operating conduit system.

In many applications, for example in the manufacture of synthetic material on a continuously moving band or belt, it has been found desirable to take periodically, at given intervals, a certain amount of pretreated material from a suitable apparatus. If the reaction is allowed to take place in a reaction vessel or chamber, the material can be released after a certain length of time. A repetition of this procedure presents difficulties in practice, however, in that upon emptying the reaction vessel, a coating of the material adheres upon the inner walls, which material as a rule is tacky or viscous and hardens in place, so that the interior volume of the vessel is quickly reduced. A continuous use of the vessel for the above-described purpose is thus rendered impossible, if the vessel is not cleaned at short intervals to remove the residues, which is a cumbersome procedure.

The above-mentioned difficulties are obviated in accordance with the teachings of this invention in that the pretreatment is effected in a reaction vessel whose wall temperature is held below the temperature of the material under treatment, whose discharge opening is closed by means of a rotating shaft which preferably carries a boring device at its end, and wherein the residual pretreated material is washed or scoured away by the new charge of material next flowing into the vessel. The closure shaft or spindle can also be provided with a mixing device. Cooling of the mixing device preferably is accomplished by the same air stream used to blow out the reaction chamber upon discharge. Opening and closing of the reaction chamber by means of the boring device of the closure shaft can be accomplished by use of a screw spindle connected between the driven end of the closure shaft and the driving motor, by changing the direction of rotation of the motor.

Other objects, features and advantages of the invention will be apparent from the following description when read with reference to the accompanying single FIGURE drawing illustrating in vertical cross-sectional one way in which the invention may conveniently be embodied in practice.

Referring now in detail to the drawing, the reference numeral 1 designates a reaction vessel or chamber having an interior mixing device 2 secured upon a closure shaft or spindle 3 which extends axially down into said vessel. The closure spindle 3 can be moved in the axial direction for opening and closing the discharge opening 1a at the lower end of the vessel, said spindle carrying on its lower end a boring device or drill 4. The drill 4 serves to clean the discharge opening 1a of the possibly remaining residual resin as will be explained hereunder. The reaction vessel 1 is further provided with an outer jacket 5 defining a cooling chamber about said vessel through which a suitable coolant 15 is pumped through conduits 14 and 13. The synthetic material in which the reaction is to take place is fed into the reaction vessel 1 through a conduit 6, and the hardener through a conduit 7.

The upper end of the closure spindle 3 is provided with a screw-threaded stud member 3a which is threadedly received in an internally-threaded drive member 8 connected to the output shaft of a drive motor 12. Opening and closure that is, lifting and lowering, respectively, of the closure spindle 3 is effected by reversing the direction of rotation of the drive motor 12. Cleaning of the opening 1a takes place while the drill 4 descends into and seals said opening.

The substances contained in the vessel or chamber 1 as well as the closure shaft or spindle 3 and the mixing device 2 are cooled by means of an air stream which enters vessel 1 through a conduit 9. The cooling air stream, after contacting the reacting substances at their upper level 18, enters the orifices 10a of vertically extending conduits 10 forming part of said mixing device and flows then up through a bore 3b in said spindle and out of an opening 11 of the spindle near the upper end thereof. The upper end of spindle 3 is surrounded by a stationary sleeve 19 which clears the opening 11 as long as the spindle is in its lowered position in which the boring device 4 seals the discharge opening 1a of the chamber. On the other hand, when the spindle is raised, the discharge opening 1a becomes free and the opening 11 is closed so that air entering into said chamber through conduit 9 from then on will serve to accelerate emptying or discharge of the chamber.

In use, a charge of hot resin is fed into the reaction vessel 1 through the conduit 6. After the resin has taken up the material remaining on the interior walls from the last charge, by operation of the mixing device 2, the required dosage of hardening material is fed into the vessel through the conduit 7. One or the other of these components is fed in at such a high temperature that the resultant mixture will be warmer than the reaction vessel, whose wall is held continuously at a predetermined temperature by the cooling medium 15. Thus no hard material will be deposited on the walls. Upon completion of the reaction period, the reaction vessel will be opened to allow flow of the pretreated material from the discharge opening 1a.

The filling and emptying of the apparatus is preferably accomplished automatically by means of a sequential switching mechanism. The material discharged from the apparatus hardens in a desired length of time, for example within a few minutes, in accordance with control conditions of the prereaction with respect to basic materials, temperature and duration of the reaction process.

Also in the apparatus according to the invention the fact that the speed of reaction is dependent upon temperature is taken into consideration. For this reason the reaction vessel with respect to all its parts coming into contact with the reaction materials is kept cooler than the reacting materials themselves, whereby the material lying upon the vessel walls and other surfaces will react more slowly than the remainder of the vessel contents. As a result, upon emptying the vessel the plastic material still clinging to the walls can readily be removed. In multi-component materials the cleaning is advantageously effected by first washing with one of the components alone. At 20, a member is shown, the outer edges of which closely hug the inner walls of the vessel. The member 20 is attached to the mixing device 2 together with the vertical conduits 10 and is adapted to assist in removing any residual material clinging to the vessel walls.

Thus, the invention provides a process for pretreating synthetic materials for hardening or partial hardening thereof, involving introducing the materials into a vessel which provides a reaction zone within the vessel and extending near to the walls of the vessel and a peripheral zone at the vessel walls. According to the invention, the temperature in the reaction zone is maintained at a relatively high level by, for example, exothermic heat of reaction, for a time sufficient for the hardening reaction to occur, and, while so maintaining the temperature in the reaction zone, maintaining the temperature of the peripheral zone at the walls at a relatively low level during the hardening reaction by providing flow of a coolant fluid along the vessel wall.

While one form of the invention is described herein, it is to be understood that this form is presented by way of example only, and that the invention is not to be limited thereto, but may be modified and embodied in various other equivalent forms without departing from its spirit. In short the invention includes all the modifications and embodiments coming within the scope of the appended claims.

What is claimed as new and for which it is desired to obtain Letters Patent is:

1. Apparatus for mixing chemically reacting materials, comprising, in combination, a closed reaction vessel having a bottom discharge opening, a cylindrical hollow shaft axially rotatable in said vessel, closure means attached to the lower end of said shaft and normally closing said discharge opening, means for charging said vessel with said materials, mixing means carried by said shaft within said vessel, means for rotating said shaft, air supply means communicating with the interior of said vessel for supplying cooling air under pressure above the level of said materials, and tubular arms attached to and communicating with said hollow shaft, said arms having at least one portion extending above the level of said materials, said extending portions having air inlet orifices above said level for the entrance of said air pressure, said hollow shaft having an air outlet opening near its upper end communicating with the atmosphere for discharging said air pressure, whereby the latter successively cools said materials, said mixing means and said shaft during its passage from the interior of said vessel through said orifices, said arms, said shaft and said outlet opening to the atmosphere.

2. Apparatus according to claim 1, wherein said shaft is axially reciprocable and said closure means seals said discharge opening in the lowered position of said shaft, means for reciprocating said shaft in axial direction, valve means in operative engagement with said shaft in the vicinity of said outlet opening and clearing the latter in said lowered position, said outlet opening being closed by said valve means and said discharge opening being cleared by said closure means upon reciprocation of said shaft into the raised position, said air pressure being operative in said raised position to forcefully discharge said materials from the interior of said vessel, and a boring device carried on said closure means for cleaning said discharge opening while said shaft moves toward said lowered position.

References Cited in the file of this patent
UNITED STATES PATENTS

| | | |
|---|---|---|
| 811,145 | Higgins | Jan. 30, 1906 |
| 2,496,653 | Allen et al. | Feb. 7, 1950 |
| 2,530,409 | Stober et al. | Nov. 21, 1950 |
| 2,687,877 | Jensen | Aug. 31, 1954 |
| 2,764,565 | Hoppe et al. | Sept. 25, 1956 |
| 2,904,407 | Rosenthal et al. | Sept. 15, 1959 |